United States Patent
Fry

(10) Patent No.: US 7,181,233 B2
(45) Date of Patent: Feb. 20, 2007

(54) MULTI-USER NON-BLOCKING DUPLEX WIRELESS VOICE COMMUNICATION SYSTEM AND METHOD

(76) Inventor: Terry L. Fry, 1068 Governors Bridge Rd., Davidsonville, MD (US) 21035

( * ) Notice: Subject to any disclaimer, the term of this patent is extended or adjusted under 35 U.S.C. 154(b) by 0 days.

(21) Appl. No.: 11/299,828

(22) Filed: Dec. 13, 2005

(65) Prior Publication Data

US 2006/0128320 A1     Jun. 15, 2006

Related U.S. Application Data

(60) Provisional application No. 60/635,946, filed on Dec. 15, 2004.

(51) Int. Cl.
*H04B 7/20* (2006.01)

(52) U.S. Cl. .................. 455/518; 455/73; 455/90.2; 455/104

(58) Field of Classification Search .............. 455/73, 455/567, 90.2, 95, 103, 104, 168.1, 221, 455/267, 517, 518, 519
See application file for complete search history.

(56) References Cited

U.S. PATENT DOCUMENTS

| | | | | |
|---|---|---|---|---|
| 5,712,848 A | * | 1/1998 | Deutsch ..................... | 370/280 |
| 5,784,685 A | * | 7/1998 | Stanford et al. ........... | 340/7.58 |
| 6,915,112 B1 | * | 7/2005 | Sutton et al. .............. | 455/67.13 |
| 2005/0143149 A1 | * | 6/2005 | Becker et al. ............. | 455/575.1 |

* cited by examiner

*Primary Examiner*—Matthew D. Anderson
*Assistant Examiner*—Tan Trinh
(74) *Attorney, Agent, or Firm*—Jones, Tullar & Cooper, PC

(57) ABSTRACT

An economical, reliable, robust and easy to use multi-user voice communication system and method suitable for use in rapidly evolving tactical or hazardous situations continuously permits each user to hear every voice communication occurring among the other users, no matter when each user speaks, and no matter how many users try to speak at once. One may characterize this as a wearable party-line radio network, because it works like a wireless party-line telephone service in that all users continuously hear every speaker, even when speaking simultaneously. The system is transportable and operable without requiring any set-up procedure or installation of a central hub or router for controlling a varying number of users when moving. Each user carries a transceiver handset with one transmitter and two or more transceivers tuned to the other transmitters in a group.

25 Claims, 2 Drawing Sheets

MULTI-USER NON-BLOCKING DUPLEX WIRELESS VOICE COMMUNICATION SYSTEM AND METHOD

RELATED APPLICATION INFORMATION

This application claims priority to co-pending provisional application No. 60/635,946, filed Dec. 15, 2004, the entire disclosure of which is incorporated herein by reference.

BACKGROUND OF THE INVENTION

1. Field of the Invention

The present invention relates to multi-user wireless voice communication methods and systems and more particularly pertains to a new wireless communication system adapted to permit many users to speak simultaneously while hearing every other user; the system and method of the present invention are especially well suited for use in tactical or potentially hazardous situations or environments.

2. Discussion of the Prior Art

Prior art multi-user wireless voice communication systems commonly use a push-to-talk (PTT) design wherein each user's radio or communication device disables its receiver when its transmitter is transmitting the user's spoken communications. PTT radios are often configured as "walkie-talkies" and have a button on one side of a housing for the user to press when speaking. Walkie-talkie users must deal with gaps in reception corresponding to their chosen speaking interval, and so a cumbersome ritual is followed in which each user completes his or her spoken message with a phrase "over" indicating that other users may speak, and that speaker is now prepared to listen.

In tactical or hazardous situations, especially when three or more users must share a communications system, this method is burdensome, in part because a user with time-sensitive emergent information may not be able to clear another speaker from the channel and so is effectively blocked from communicating. If the user attempting to communicate about the emergency does successfully transmit, at least one other user, the interrupted speaker, will not hear.

Some wireless communication systems employ voice-activated PTT circuitry (also known as "VOX" circuitry) to enable one user's transmitter while blocking other users' transmitters. If more than one user speaks up at a given time, the second user may be blocked. VOX activation is a feature widely used in communications systems employing hands-free headsets, such headsets typically include at least one microphone and at least one ear speaker.

In tactical situations, users in an assault team may be spread out to surround an objective and may not be able to see one another. Each user may have a unique perspective. For example, if a building is being assaulted, three or more users on the ground may need to communicate with an observer hovering overhead in a helicopter. Any one of those users may need to shout a warning to another user instantly, irrespective of whether the user to be warned is speaking at that moment, and all users in the assault team may need to hear every contribution to the conversation, even if simultaneously spoken. In the stress and heat of an engagement, hearing both sides of a shouting match between users may be vital to the survival of one or all the users.

First responders in civil emergencies have similar needs. Firemen entering a large, damaged structure need to find injured or helpless occupants as quickly as possible and may require members of a team entering the structure to be able to communicate in real time and simultaneously so that the users can support and come to the aid of one another.

Similarly, police or SWAT team members will require an improved method of communicating. Police or SWAT team members entering a structure or area occupied by moving, hostile criminals may need to find injured occupants or hostages quickly and may require members of the team entering the area to be able to communicate in real time and simultaneously so that the team members can identify hostile actors or targets and support and come to the aid of one another, as a situation develops.

There is a need, therefore, for an economical, reliable, truly robust and easy to use multi-user voice communication system and method suitable for use in rapidly evolving tactical or hazardous situations, permitting each user to hear every voice communication occurring among the other users, no matter when each user speaks, and no matter how many users try to speak at once. One may characterize this as a need for a "party-line" radio system, so named because it should work like a party-line telephone service, where all can hear every speaker, even when all users are speaking simultaneously.

Ideally, the system should be transportable and operable without requiring an elaborate set-up procedure requiring installation of a central hub or router for controlling a varying number of users when moving.

OBJECTS AND SUMMARY OF THE INVENTION

Accordingly, it is a primary object of the present invention to overcome the above mentioned difficulties by providing an economical, reliable, robust and easy to use multi-user voice communication system and method suitable for use in rapidly evolving tactical or hazardous situations, permitting each of several users to hear every voice communication occurring among the other users, no matter when each user speaks, and no matter how many users try to speak at once.

Another object of the present invention is providing an easily carried, multi-user communication unit or radio working within a system that requires no central hub for routing communications among several users, and which permits the users to move together or in separate directions, so that the number of users in a communicating group is seamlessly varied as tactical requirements dictate.

The aforesaid objects are achieved individually and in combination, and it is not intended that the present invention be construed as requiring two or more of the objects to be combined unless expressly required by the claims attached hereto.

In an exemplary embodiment of the present invention, a tactical alert communication system provides a secure party-line voice communication link for up to six users. The communication system is fully non-blocking so that each user can simultaneously hear themselves as well as the other five members. The communication system is fully self contained, operated without the use of a common carrier or hub.

Unlike hub-based systems, the communication system of the present invention allows, in accordance with the method of the present invention, all of the team members to move as a group, not tethered to a central point. Alternatively, groups can split up into subgroups and rejoin as desired, and the communication system seamlessly manages communication so that the splitting of groups and the reintegration of group members or users as they come back into range is automatic and transparent to each user. A communication system can be comprised of as few as two individual radios or handsets.

Each radio or handset is substantially identical, except that it's transmitter is tuned to a unique frequency so that, for example, in a system comprising, e.g., six handsets, each of the six has a unique transmission frequency. For the system of this example, each handset also includes five internal receiver circuits. For frequencies nominally identified as A, B, C, D, E, and F, the handset having a transmitter tuned to frequency A will have its five internal receivers tuned to the other frequencies, namely, B, C, D, E and F.

In the system of this example, the handset with it's transmitter tuned to frequency B will have five internal receivers tuned to the remaining frequencies, namely, A, C, D, E and F. Accordingly, the handset with it's transmitter tuned to frequency C will have five internal receivers tuned to the remaining frequencies, namely, A, B, D, E and F; the handset with it's transmitter tuned to frequency D will have five internal receivers tuned to the remaining frequencies, namely, A, B, C, E and F; the handset with it's transmitter tuned to frequency E will have five internal receivers tuned to the remaining frequencies, namely, A, B, C, D and F; and the handset with it's transmitter tuned to frequency F will have five internal receivers tuned to the remaining frequencies, namely, A, B, C, D and E.

Each handset has, as part of the receiver preprocessing circuitry, a notch-filter tuned to desensitize all of the internal receivers to energy on the unique assigned transmission frequency for that particular handset. And so, in accordance with the method of the present invention, a communication system having N users will include handsets having (N–1) received channels where each user has a, unique, (preferably) fixed assigned transmitter frequency and that handset preferably has a notch-filter for removing energy at that transmit frequency from the signals fed to the N–1 received channels in that handset.

This radio architecture does not require a push-to-talk (PTT) control scheme, since each of the plurality of internal receivers within each handset continuously feeds received signals back to that handset's user, and so if other team members are speaking simultaneously, the internal receiver circuits in each handset continuously receive all of the transmitted frequencies and convert all the baseband audio for each handset user. Within each handset, a buffer side-tone signal amplifier feeds that handset's microphone signal back into the earphone circuit configured to receive a baseband signal from each of the received channels in the handset. With this structure, each user can hear her or himself simultaneously with each of the other (e.g., N–1) users or members of the team.

The internal receiver circuits in the handset are not de-sensitized or de-sensed by actuation of the handset's transmitter due to the action of the notch-filter. Since the internal receivers are operating in parallel, they do not interfere with one another when simultaneous conversations are going on among users of the N different assigned frequencies.

In the preferred embodiment, the point-to-point range between handsets is up to two miles and, given the selected battery capacity, each handset can operate up to three and a half hours for a system having six users (with squelch). Preferably, a nickel metal hydride (Ni MH) battery is included. The transmissions from each of the handsets can be digitally coded and scrambled for enhanced security. Optionally, the handsets can be configured to transmit on two frequencies per channel for frequency diversity and to prevent jamming. Optionally, for power saving, a squelch circuit can be employed to cut power to the transmitter, the D/A converter, the codec, and the ADD converter and individual channels may be quieted on low received signal strength, dropping power to the codec and D/A.

The preferred size of a handset's protective housing is approximately 1.4 inches by 3.5 inches by 5.75 inches and each handset weighs approximately 1 pound and 11 ounces. Optionally, the housing carries one or more antennae in a configuration adapted to adhere to the contours or the exterior surface of the housing. A removable headset carrying at least one earphone and one microphone is optionally configured in the cell phone accessory headset style. The handset housing is preferably waterproof and made from glass reinforced high impact polymer material. The glass fiber reinforced high impact dielectric case preferably includes a shock mounting for the battery and a separate electronics compartment which includes air-tight membranes or gaskets.

This design permits an economically robust handset to be provided to each of the users. It is expected that the parts cost for each handset will be on the order of a few hundred dollars, including a battery charger for use with the Ni MH battery.

Preferably, the handsets are clustered together in color-coded groups such that each handset in a group of e.g., six is a unique color. Each handset in the group is preferably preprogrammed. Optionally, user groups may carry handsets configured to be programmable on the fly to define or identify the users in a group, when in the field.

In a specific embodiment of the handset, a transducer such as an electret microphone is connected to an audio signal conditioner which is also connected to and responsive to a squelch threshold adjustment circuit. The audio signal conditioner provides a microphone audio signal through a buffer amplifier to provide a side-tone signal back to an "audio out" earphone transducer driving amplifier for connection to the user's earphone transducer, thereby allowing the user to hear her or his own contribution to an ongoing multi-user conversation. The audio signal conditioner also provides an output signal to an analog to digital (A/D) converter which digitizes the voice signal, providing a digitized signal to a transmitter control digital circuit. The transmitter control digital circuit provides a digitized signal to a digital to analogue (D/A) converter which provides an analog transmission signal to an RF or microwave transmitter amplifier (preferably transmitting a signal of between one hundred to three hundred milli-watts in strength). The transmitter signal is input to a diplexer which is connected to an antenna. The diplexer may have a band-stop frequency selective characteristic, notching out the transmitter frequency and providing a receive signal to a buffer amplifier stage which provides a selected amount of received signal pre-amplification. The pre-amplified received signal is then input to a band-pass filter and the band pass filtered received signal is input to a mixer also fed by a temperature control crystal oscillator (TCXO) to provide a first intermediate frequency (IF) signal. Optionally, a notch-filter is provided in a first IF to remove signals corresponding to the transmitted signal, thereby avoiding de-sensing the internal receivers whenever the transmitter is active in the handset. The first IF signal is input to a second buffer amplifier stage to provide a buffered and amplified first IF signal to, in the present example, five internal receiver processor chips, each tuned to unique frequencies other than the transmitter frequency and corresponding to the transmit frequencies of the other handsets in the user's group. Each of the internal receiver processor chips preferably includes a 400 megahertz demodulator providing a unique demodulated received signal in the form of a baseband analog audio signal and each of the unique receiver processor chip output analog audio signals is summed or combined and input to an "audio out" amplifier which, combined with the side tone signal, provide audio for the user of that handset.

Preferably, the handset also includes a power supply providing a 500 milliamp current at 3.3 volts (e.g., from the battery and power conditioner) to power a microcontroller and all of the other circuitry within the handset. The receiver processor chip preferably includes a compressed voice decoder and a digital to analog converter, all integrated into one semiconductor circuit or chip. Optionally, the frequencies may be assigned in split bands to permit transmitting and receiving to occur in separate assigned channels for each user.

In accordance with the method of the present invention, a communication system is selected having N (e.g., N=6) users and the handsets are configured with N–1 (e.g., 5) internal received channels where each handset is assigned a distinctive transmit frequency, whereby N users have N handsets transmitting on N unique, assigned frequencies.

Whenever a given user takes a handset and wanders out of range of other handsets (e.g., beyond 2 miles for the transmitter power in the exemplary embodiment), that user is simply no longer heard on the assigned received channels within the other handsets in the system, and so seamlessly drops out of the communication network. If that user should then travel back within the range of the group's handsets or radios, the signal transmitted from the wandering user is again detected and processed by the assigned received channels in each of the other handsets of the group, and the wandering user seamlessly rejoins the communication of the group. In this way, groups can split up and reconstitute themselves without any adjustments to the handsets or resort to a network hub.

In accordance with the method of the present invention, the absence of the wandering user's transmitted signal may be used to indicate to one or more of the other user's that the wandering user has strayed or been left behind.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 1:
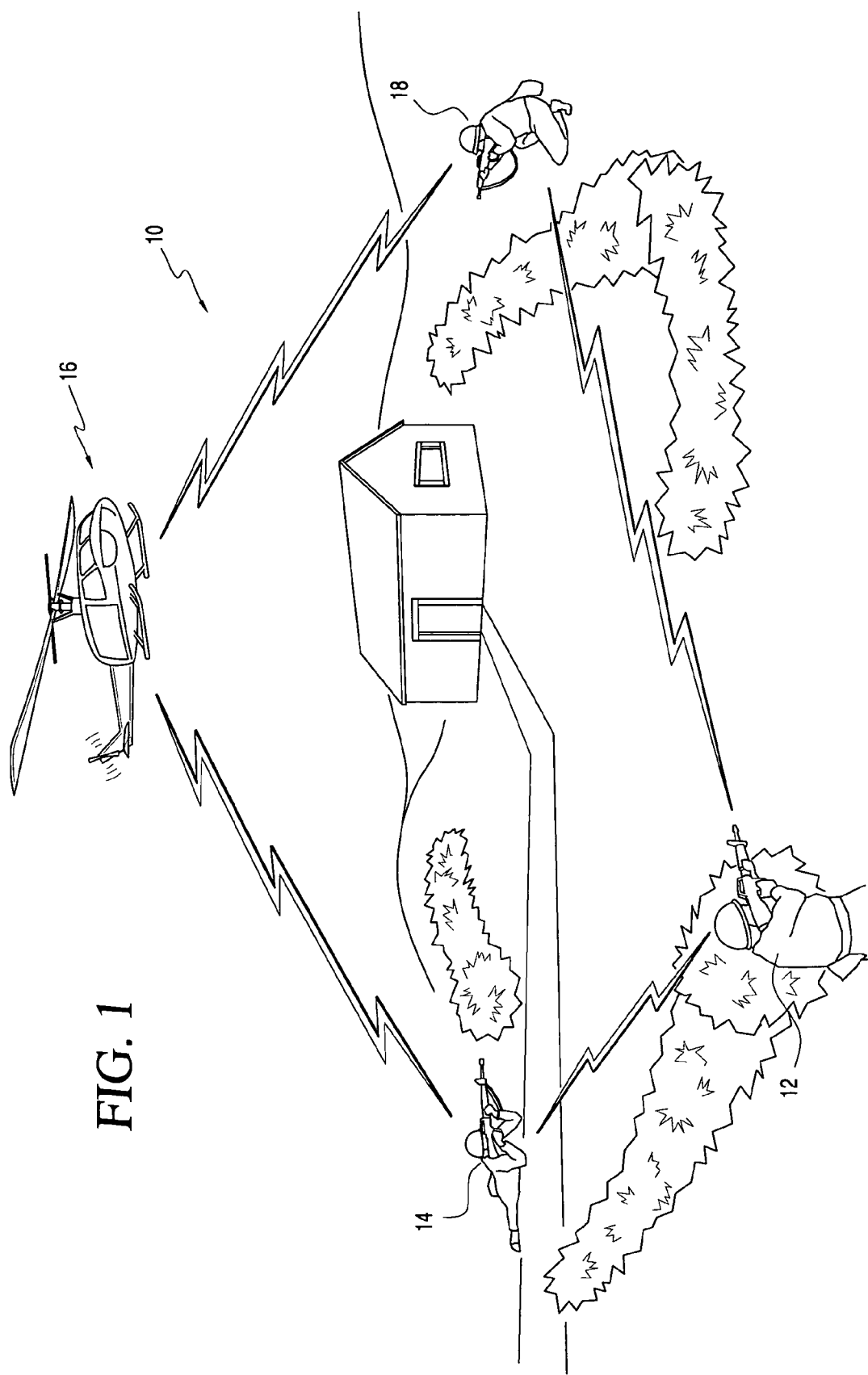
FIG. 1 is a diagram illustrating a non-blocking wireless communication system for a plurality of users adapted to wirelessly transmit a plurality of signals to each user in the system, in accordance with the present invention.
Figure 2:
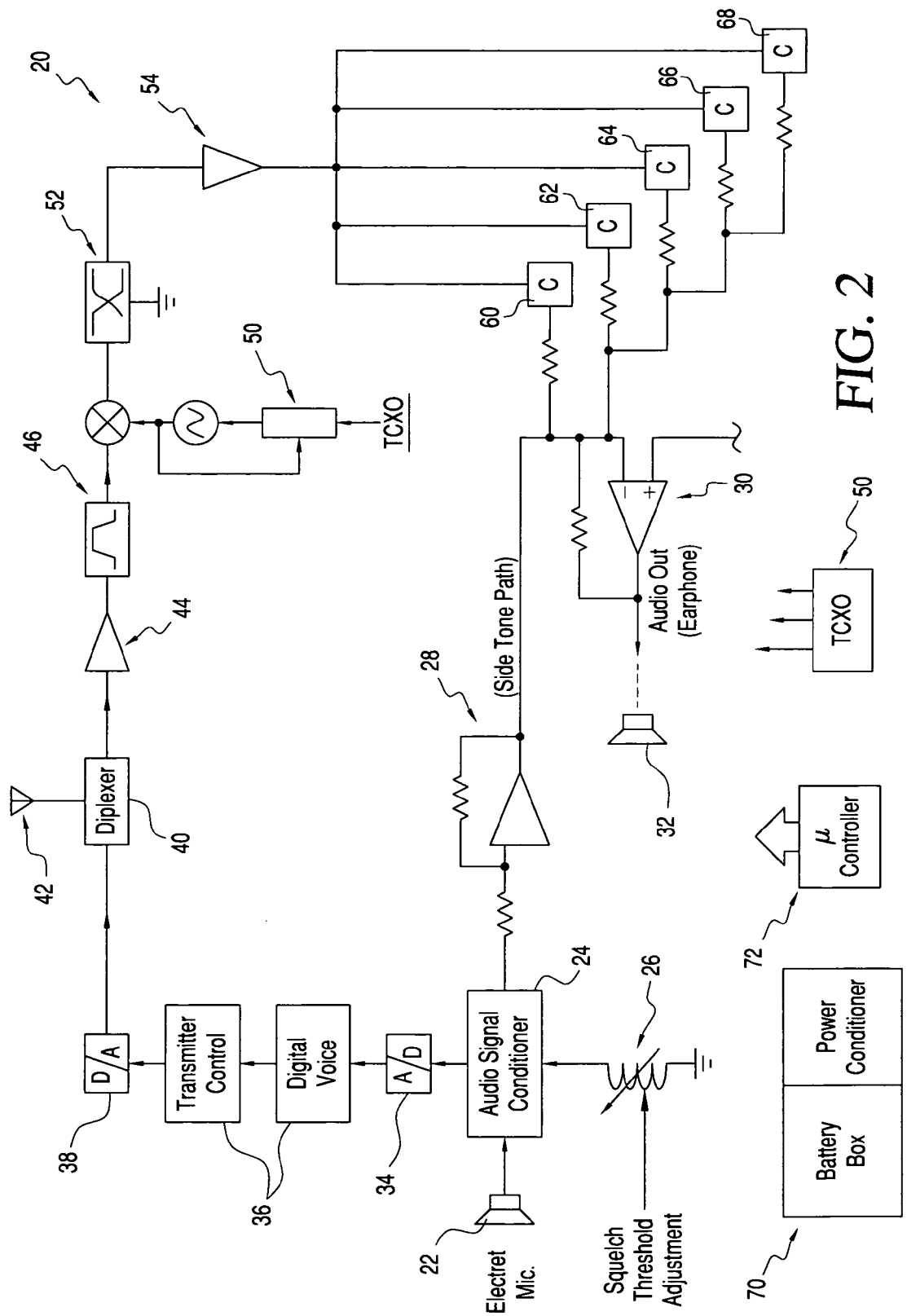
FIG. 2 is a schematic diagram of an exemplary six-user handset or radio used by a user in the system of FIG. 1, in accordance with the present invention

Turning now to FIGS. 1 and 2, a multi-user non-blocking duplex wireless voice communication system 10 includes a plurality (e.g., four) portable handsets or radios carried by mobile users 12, 14, 16 and 18 when engaged in a tactical maneuver or engagement in the field. Tactical alert communication system 10 provides a secure party-line voice communication link for four users, 12, 14, 16, and 18, and is configurable for more users. This example is not limiting, since many more users can be accommodated in the system of the present invention 10. The communication system is Duplex and fully non-blocking so that each user can simultaneously hear him or herself as well as the other three users. Communication system 10 is fully self contained, and operates without the use of a common carrier or hub. Unlike hub-based systems, communication system 10 allows all of the team members to continuously move as a group over a vast area, not tethered to a central point. Alternatively, users 16 and 18 can separate (e.g., fly away) and thereby split up into a subgroup communicate among themselves and then later rejoin the group of FIG. 1 as desired, and communication system 10 seamlessly manages communication so that the splitting of groups and the reintegration of group members or users as they come back into range is automatic and transparent to each user. Communication system 10 can be comprised of as few as two individual radios or handsets.

As best seen in the diagram of FIG. 2, an exemplary handset or radio 20 (e.g., one operating in a manner similar to handsets 12, 14, 16, or 18), is substantially identical, except that it's transmitter is tuned to a unique frequency so that, for example, in a system comprising as many as six handsets, each handset has a unique transmission frequency. For the system of this example, each handset also includes five internal receiver circuits. For frequencies nominally identified as A, B, C, D, E, and F, handset 20 has a transmitter tuned to frequency A and has five internal receivers 60, 62, 64, 66, and 68 tuned to the other frequencies, namely, B, C, D, E and F, respectively.

In the system of this example, the handset with it's transmitter tuned to frequency B (e.g., 14) will have five internal receivers tuned to the remaining frequencies, namely, A, C, D, E and F. Accordingly, the handset with it's transmitter tuned to frequency C (e.g., 16) will have five internal receivers tuned to the remaining frequencies, namely, A, B, D, E and F; the handset with it's transmitter tuned to frequency D (e.g., 18) will have five internal receivers tuned to the remaining frequencies, namely, A, B, C, E and F; a handset with it's transmitter tuned to frequency E will have five internal receivers tuned to the remaining frequencies, namely, A, B, C, D and F; and a handset with it's transmitter tuned to frequency F will have five internal receivers tuned to the remaining frequencies, namely, A, B, C, D and E.

Each transmitter (e.g., 36, 38) generates a transmitted signal using a standard form of modulation (e.g., AM) at a selected frequency (e.g., 6xx MHz, 7xx MHz, 915 MHz, 10xx MHz or 11xx MHz). Frequency assignments are preferably in appropriate bands, but can be, for example in any practicable range such as 300 MHz thru 5 GHz. Appropriate assignments for frequency in any of the public service bands would be, for example, 902–928 MHz, 2.4 to 2.482 GHz, or 4.940 to 4.990 GHz. With adaptations to the exemplary embodiment, the transmitted modulation types can include frequency shift keying (fsk), or msk or psk modulation.

Each handset preferably has, as part of the receiver preprocessing circuitry, an optional notch-filter 52 tuned to desensitize all of the internal receivers (e.g., 60, 62, 64, 66 and 68) to energy on the assigned transmission frequency for that handset. And so, in accordance with the method of the present invention, a communication system having N (e.g., 6) users will include handsets having N–1 (e.g., 5) received channels, where each user has a unique, fixed assigned transmitter frequency and that handset has a notch-filter removing energy at that transmit frequency from the signals fed to the N−1 received channels in that handset.

This radio architecture does not require a push-to-talk (PTT) control scheme since each of the plurality of internal receivers within each handset continuously feeds received signals back to that handset's user, and so if other team members are speaking simultaneously, the internal receiver circuits in each handset (e.g., 60, 62, 64, 66 & 68) continuously receive all of the transmitted frequencies and convert all the base band audio for each handset user. Within each handset, a buffer side-tone signal amplifier 28 feeds that handset's microphone signal (e.g., from mic 22) back into the earphone circuit (e.g., 30, driving earspeaker 32) configured to receive a base band signal from each of the received channels in the handset. With this structure, each user can hear her or himself simultaneously with each of the other members of the team.

The internal receiver circuits in the handset are not de-sensitized or de-sensed by actuation of the handset's transmitter due to the action of notch-filter 52. Since the internal receivers (e.g., 60, 62, 64, 66 & 68) are operating in parallel, they do not interfere with one another when simultaneous conversations are going on among users of the N different assigned frequencies.

In the preferred embodiment, the point-to-point range between handsets is up to two miles and, given the selected battery capacity, each handset can operate up to three and a half hours for a system having six users with squelch. Preferably, a nickel metal hydride (Ni MH) battery 70 is included. The transmissions from each of the handsets can be digitally coded and scrambled for enhanced security. Optionally, the handsets can be configured to transmit on two frequencies per channel for frequency diversity and to prevent jamming. Optionally, for power saving, a squelch circuit can be employed to cut power to the transmitter, the D/A converter, the codec, and the A/D converter and individual channels may be quieted on low received signal strength, dropping power to the codec and D/A.

The preferred size of a handset is approximately 1.4 inches by 3.5 inches by 5.75 inches and each handset weighs approximately 1 pound and 11 ounces. A removable headset carrying at least one earphone and one microphone is optionally configured in the cell phone accessory headset style. The handset housing is preferably waterproof and made from glass reinforced high impact polymer material. The glass fiber reinforced high impact dielectric case preferably includes a shock mounting for the battery and a separate electronics compartment which includes air tight membranes or gaskets.

This design permits an economically robust handset to be provided to each of the users. It is expected that the parts cost for each handset will be on the order of a few hundred dollars including a battery charger for use with the Ni MH battery.

Preferably, the handsets are clustered together in color-coded groups such that each handset in a group of e.g., six is a unique color. Each handset in the group is preferably preprogrammed. Optionally, user groups may carry handsets configured to be programmable on the fly to define who the users in a group are when in the field.

In the specific embodiment of handset 20 illustrated in FIG. 2, a transducer such as an electret microphone 22 generates a base band audio signal and is connected to an audio signal conditioner 24 which is also connected to and responsive to a squelch threshold adjustment circuit 26. Audio signal conditioner 24 provides a microphone audio signal through a buffer amplifier 28 to provide the side-tone signal back to an "audio out" earphone transducer driving amplifier 30 for connection to the user's earphone transducer 32, thereby allowing the user to hear her or his own contribution to the ongoing conversation. The audio signal conditioner 24 also provides an analog voice output signal to an analog to digital (A/D) converter 34 which digitizes the voice signal, providing a digitized voice signal to a transmitter control digital circuit 36. The transmitter control digital circuit 36 provides a digitized transmitter signal to a digital to analogue (D/A) converter 38 which optionally provides an analog transmission signal to an RF or microwave transmitter amplifier preferably transmitting a signal of between one hundred to three hundred milli-watts in strength. The transmitter signal is input to a diplexer 40 which is connected to an antenna 42. The diplexer 40 may have a band-stop frequency selective characteristic for the received signal path, notching out the transmitter frequency and providing a receive signal to a received signal buffer amplifier stage 44 which provides a selected amount of received signal pre-amplification.

The pre-amplified received signal is then input to a band-pass filter 46 and the band pass filtered signal is input to a mixer 48 that receives an oscillator signal generated by a temperature controlled crystal oscillator (TCXO) 50 to provide a first intermediate frequency (IF) signal. Optionally, a notch-filter 52 is provided in the first IF to remove signals corresponding to the transmitted signal, thereby avoiding desensitizing or overloading the internal receivers 60, 62, 64, 66, and 68 whenever the transmitter 36 is active in the handset. The first IF signal is input to a second buffer amplifier stage 54 to provide a buffered and amplified first IF signal to (in the present example) five internal receiver processor circuits (e.g., integrated circuits or chips) 60, 62, 64, 66 and 68, each tuned to unique receive frequencies other than the handset's own transmitter frequency.

In accordance with the method of the present invention, each internal receiver circuit 60, 62, 64, 66 and 68 is tuned to a unique frequency corresponding to the transmit frequencies selected for the other handsets in the user's group. Each of the internal receiver processor chips (60, 62, 64, 66 and 68) preferably includes a 400 megahertz demodulator providing a unique demodulated received signal in the form of a base band analog audio signal and each of the unique receiver processor chip output analog audio signals is summed or combined and input to an "audio out" amplifier 30 which, once combined with the handset's own side tone signal from amp 28, provides the summed audio signal in an amplified form for playback through ear speaker 32 for the user of that handset.

Preferably, the handset also includes a power supply 70 providing a 500 milliamp current at 3.3 volts (e.g., from the battery and power conditioner) to power a micro controller 72 and all of the other circuitry within handset 20. The receiver/processor chips 60, 62, 64, 66 and 68 preferably each include a compressed voice decoder and a digital to analog converter, all integrated into one semiconductor circuit or chip.

Optionally, the system's assigned frequencies may be assigned in split bands to permit transmitting and receiving to occur in separate assigned channels for each user; optional exemplary split band frequency selections, in MHz, are (6xx/7xx), (7xx/915) and (7xx/10xx or 11xx), where 6xx identifies a selected frequency in the range of 600 MHz thru 699 MHz.

In accordance with the method of the present invention, a communication system (e.g., 10) is selected having N users (e.g., four users, as shown in FIG. 1) and the handsets are configured with N−1 (e.g., three) internal received channels where each handset is assigned a distinctive transmit frequency, whereby N (e.g., four) users have N (e.g., four) handsets transmitting on N (e.g., four) unique assigned frequencies.

Whenever a given user takes a handset and wanders out of range of other handsets (e.g., beyond 2 miles), that user is simply no longer heard on the assigned received channels within the other handsets in the system used by her or his group, and so seamlessly drops out of the group's communication network. If that user should then travel back within the range of the group's handsets or radios, the signal transmitted from the wandering user is again detected and processed by the assigned received channels in each of the other handsets of the group, and the wandering user seamlessly rejoins the communication of the group. In this way, groups can split up and reconstitute themselves without any adjustments to the handsets or resort to a network hub.

In accordance with the method of the present invention, the absence of the wandering user's transmitted signal may be used to indicate to one or more of the other user's that the wandering user has strayed or been left behind. Alternatively, the absence of a signal in one or more receivers may be used as a triggering event for powering down one or more of the receiver circuit segments.

The communication system and method of the present invention are well suited for use by excited or distracted users confronting demanding environments. In a tactical situation such as that shown in FIG. 1, users in an assault team may be spread out to surround an objective and may not be able to see one another. Each user (e.g., those carrying handsets 12, 14 and 18) can talk continuously to team members about his or her own unique perspective. For the building being assaulted, three or more users on the ground can also communicate with an observer hovering overhead in a fourth user in the helicopter carrying an optional, additional handset. Any one of those users may need to shout a warning to another user instantly, irrespective of whether the user to be warned is speaking at that moment, and all users in the assault team may need to hear every contribution to the conversation, even if simultaneously spoken. In the stress and heat of an engagement, hearing both sides of a shouting match between users may be vital to the survival of one or all the users, and when using system 10, ugly shouting matches are fully supported.

First responders in civil emergencies can also use communication system 10, Firemen entering a burning or damaged structure need to find injured or helpless occupants as quickly as possible and may require members of a team entering the structure to be able to communicate in real time and simultaneously so that the users can support and come to the aid of one another.

Similarly, police or SWAT team members can use communication system 10 in an improved method of communicating and when entering a structure or area occupied by moving, hostile criminals can talk to one another continuously to find injured occupants or hostages quickly. The system and method of the present invention enables members of the team entering the area to be able to communicate in real time and simultaneously so that the team members can identify hostile actors or targets and support and come to the aid of one another, as a situation develops.

For any of the foregoing operational environments, optional visible indicia (not shown) carried on the exterior of the housing or the headset are used to enable users or team members to quickly identify interoperable handsets configured for use in a pre-defined network. Preferably, color coded indicia are displayed on at least one handset or transceiver (e.g., 20) to visibly designate interoperability arising from assigned transmit and receive frequencies for a selected team's handsets, which can be stored or carried together, as a set.

It will be understood by those of skill in the art that the wireless communication system of the present invention can be changed without departing from the spirit and scope of the present invention. For example, an "assigned frequency" for a given transmitter can be changed over an interval, and the system requires that the corresponding receivers in each of the other handsets in the group must also be pre-programmed to change in a synchronized manner, so that continuous communication remains available. Also, while the illustrative embodiment shows one antenna connected thru a diplexer to separate the transmitted and received signal, it is also possible to use two or more antennae, one each for the transmitter and the receivers, where both antennae are carried on the housing, for example on opposing sides of a box-shaped housing.

Microcontroller 72 is programmed to operate the system 10 and each handset comprising the system in the manner described above, but may optionally be reprogrammed to receive group size/frequency assignment information when in the field. Optionally, the reprogramming information is transmitted from another handset or is input through a removable data input interface including, for example, a keyboard and a display.

Having described preferred embodiments of a new and improved wireless communications system and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A multi-user non-blocking duplex wireless voice communication system for continuous and simultaneous voice communication among a plurality of users in a group, comprising:
   (a) a first portable handset having a first transducer or microphone adapted to generate a first handset microphone signal and having a transmitter responsive to said first handset microphone to continuously transmit a wireless signal through a handset antenna, said transmitter being adapted to continuously generate a signal at a first assigned frequency;
   (b) said first handset including a first side tone signal generating circuit adapted to buffer said first microphone signal and generate a side tone audio signal in response thereto;
   (c) said first handset including a first receiver adapted to receive and continuously demodulate a transmitted signal received through said antenna at a second assigned frequency and continuously generate a first receiver audio signal in response thereto;
   (d) said first handset including a second receiver adapted to receive and continuously demodulate a transmitted signal received through said antenna at a third assigned frequency and continuously generate a second receiver audio signal in response thereto;
   (e) wherein said side tone audio signal, said first receiver audio signal and said second receiver audio signal are combined and continuously reproduced through a first audio transducer, so that a first user of said first handset can simultaneously and continuously hear said first user speak while second and third users on second and third handsets assigned said second and third assigned frequencies can also hear said first, second and third users speak simultaneously and continuously.

2. The multi-user, non-blocking, duplex, wireless, voice communication system of claim 1, further comprising:
(f) a second microphone in said second portable handset adapted to generate a second handset microphone signal and having a transmitter responsive to said second handset microphone to continuously transmit a wireless signal through a handset antenna, said transmitter being adapted to generate a signal at said second assigned frequency;
(g) said second handset including a side tone signal generating circuit adapted to buffer said second microphone signal and generate a side tone audio signal in response thereto;
(h) said second handset including a first receiver adapted to receive and continuously demodulate a transmitted signal received through said second antenna at said first assigned frequency and continuously generate a first receiver audio signal in response thereto;
(i) said second handset including a second receiver adapted to receive and continuously demodulate a transmitted signal received through said antenna at said third assigned frequency and continuously generate a second receiver audio signal in response thereto;
(j) wherein said first receiver audio signal, said second receiver audio signal and said side tone audio signal are combined and reproduced through an audio transducer, so that a user of said second handset can simultaneously hear said first user speak while second and third users on handsets assigned said second and third assigned frequencies can also hear said first, second and third users speak simultaneously and continuously.

3. The multi-user, non-blocking, duplex, wireless, voice communication system of claim 2, further comprising, in said first handset, an analog to digital converter configured to receive said first handset microphone signal and generate a first digitized microphone signal in response thereto.

4. The multi-user, non-blocking, duplex, wireless, voice communication system of claim 3, further comprising, in said first handset, a transmitter control circuit configured to sense said first digitized microphone signal and generate a first digital transmission signal in response thereto.

5. The multi-user, non-blocking, duplex, wireless, voice communication system of claim 4, further comprising, in said first handset, a digital to analog converter configured to receive said first digital transmission signal and generate said transmitter signal at said first assigned frequency in response thereto.

6. The multi-user, non-blocking, duplex, wireless, voice communication system of claim 5, further comprising, in said first handset, a diplexer having an first second and third ports, said diplexer first port being configured to receive said transmitter signal at said first assigned frequency and said diplexer second port being configured provide said transmitter signal at said first assigned frequency to said handset first antenna.

7. The multi-user, non-blocking, duplex, wireless, voice communication system of claim 6, further comprising, in said first handset, a frequency selective filter circuit connected to said diplexer third port and being configured to receive, through said handset first antenna, another handset's transmitter signal at a received frequency differing from said first assigned frequency, said frequency selective filter circuit outputting a filtered received signal at said received frequency.

8. The multi-user, non-blocking, duplex, wireless, voice communication system of claim 7, further comprising, in said first handset, a notch filter circuit connected to said frequency selective filter circuit and being configured to attenuate said first assigned frequency, said notch filter circuit outputting a notch filtered received signal at said received frequency.

9. The multi-user, non-blocking, duplex, wireless, voice communication system of claim 7, further comprising, in said first handset, a first tuned receiver responsive to said received signal at said received frequency, said first receiver pre-tuned to continuously demodulate said received signal solely for a selected handset's pre-assigned transmission signal and generate said first receiver audio signal in response thereto.

10. The multi-user, non-blocking, duplex, wireless, voice communication system of claim 9, further comprising, in said first handset, a second tuned receiver responsive to said received signal at said received frequency, said second receiver pre-tuned to continuously demodulate said received signal solely for a second selected handset's pre-assigned transmission signal and generate said second receiver audio signal in response thereto.

11. The multi-user, non-blocking, duplex, wireless, voice communication system of claim 1, further comprising a portable power supply and a portable or wearable protective housing adapted to carry and protectively envelop or enclose said handset transmitter and said receivers.

12. The multi-user, non-blocking, duplex, wireless, voice communication system of claim 1, further comprising a programmable microcontroller configured to store and execute programs including designating and tuning assigned frequencies for said handset transmitter and said receivers.

13. A mobile, wireless, full duplex voice communication system comprising
a first portable wireless transceiver handset including at least one transmitter adapted to transmit continuously on a first unique assigned frequency and at least first and second receivers adapted to receive continuously and simultaneously on second and third unique assigned frequencies, such that an ambulatory user of said first portable wireless transceiver handset can speak and transmit continuously on said first frequency and can simultaneously and continuously receive spoken messages from all users of other handsets transmitting on said second and third unique assigned frequencies.

14. The mobile, wireless, full duplex voice communication system of claim 13, further comprising:
a second portable wireless transceiver handset including at least one transmitter adapted to transmit continuously on said second unique assigned frequency and at least first and second receivers adapted to receive continuously and simultaneously on said first and third unique assigned frequencies, such that an ambulatory user of said second portable wireless transceiver handset can speak and transmit continuously on said second frequency and can simultaneously and continuously receive spoken messages from users of other handsets transmitting on said first and third unique assigned frequencies.

15. A non-blocking multi-user wireless communications method, comprising the steps of:
 (a) providing a first transceiver including a transmitter configured to continuously transmit on a first assigned frequency, a first receiver configured to continuously receive on a second assigned frequency, and a second receiver configured to continuously receive on a third assigned frequency;
 (b) providing a second transceiver including a transmitter configured to continuously transmit on said second assigned frequency, a first receiver configured to continuously receive on said first assigned frequency, and a second receiver configured to continuously receive on said third assigned frequency;
 (c) providing a third transceiver including a transmitter configured to continuously transmit on said third assigned frequency, a first receiver configured to continuously receive on a said first assigned frequency, and a second receiver configured to continuously receive on said second assigned frequency;
 (d) transmitting continuously on said first assigned frequency with said first transceiver, while listening simultaneously and continuously on said first, second and third transceivers.

16. The method of claim 15, further comprising the step of:
 (e) transmitting continuously on said second assigned frequency with said second transceiver, while listening simultaneously and continuously on said first, second and third transceivers.

17. The method of claim 16, further comprising the step of:
 (f) transmitting continuously on said third assigned frequency with said third transceiver, while listening simultaneously and continuously on said first, second and third transceivers.

18. The method of claim 17, further comprising the step of:
 (g) providing a fourth transceiver including a transmitter configured to continuously transmit on a fourth assigned frequency, a first receiver configured to continuously receive on a said first assigned frequency, and a second receiver configured to continuously receive on said second assigned frequency and a third receiver configured to continuously receive on said third assigned frequency;
 (h) reconfiguring said first, second and third transceivers with third receivers to continuously receive on said fourth assigned frequency.

19. The method of claim 17, further comprising the step of:
 (g) providing, in at least one of said transceivers, a microcontroller configured to be programmed when in the field, for system operation information including assigned transmit and receive frequencies for a selected user group.

20. The method of claim 19, further comprising the step of:
 (h) programming said microcontroller for assigned transmit and receive frequencies for a selected user group.

21. A method of communicating among two or more team members when entering a potentially hazardous area, comprising:
 (a) providing a first transceiver including a transmitter configured to continuously transmit on a first assigned frequency, a first receiver configured to continuously receive on a second assigned frequency, and a second receiver configured to continuously receive on a third assigned frequency;
 (b) providing a second transceiver including a transmitter configured to continuously transmit on said second assigned frequency, a first receiver configured to continuously receive on said first assigned frequency, and a second receiver configured to continuously receive on said third assigned frequency;
 (c) deploying a first team member in a first position and operating said first transceiver enabling said first team member to talk and transmit continuously on said first assigned frequency while continuously listening to any signals received from another team member on said second or third assigned frequency; and
 (d) deploying a second team member in a second position and operating said second transceiver enabling said second team member to talk and transmit continuously on said first assigned frequency while continuously listening to any signals received from said first team member on said first assigned frequency or another team member on said third assigned frequency.

22. The method of claim 21, further comprising the step of:
 (e) providing a third transceiver including a transmitter configured to continuously transmit on said third assigned frequency, a first receiver configured to continuously receive on said first assigned frequency, and a second receiver configured to continuously receive on said second assigned frequency; and
 (f) deploying a third team member in a third position and operating said third transceiver enabling said third team member to talk and transmit continuously on said third assigned frequency while continuously listening to any signals received from said first team member on said first assigned frequency or said second team member on said second assigned frequency.

23. The method of claim 21, further comprising the step of:
 (g) providing, in at least one of said transceivers, a microcontroller configured to be programmed when in the field, for system operation information including assigned transmit and receive frequencies for a selected team of team members or users.

24. The method of claim 23, further comprising the step of:
 (h) programming said microcontroller for assigned transmit and receive frequencies for a selected team.

25. The method of claim 21, further comprising the step of:
 (i) providing color coded indicia on at least one transceiver to visibly designate interoperability arising from assigned transmit and receive frequencies for a selected team.

* * * * *